(12) United States Patent
Su et al.

(10) Patent No.: US 7,078,463 B2
(45) Date of Patent: Jul. 18, 2006

(54) HIGH OXYGEN TRANSMISSION BIAXIALLY ORIENTED POLYPROPYLENE FILM

(75) Inventors: Tien-Kuei Su, Saunderstown, RI (US); Keunsuk P. Chang, North Kingstown, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 208 days.

(21) Appl. No.: 10/738,984

(22) Filed: Dec. 19, 2003

(65) Prior Publication Data

US 2005/0137336 A1    Jun. 23, 2005

(51) Int. Cl.
*C08F 255/02* (2006.01)
*C08F 10/06* (2006.01)
*B32B 27/32* (2006.01)

(52) U.S. Cl. ............... 525/236; 525/249; 525/322; 526/351; 526/352; 428/34.6; 428/36.91; 428/515

(58) Field of Classification Search ............ 525/236, 525/249, 322; 526/351, 352; 428/34.6, 428/36.91, 515

See application file for complete search history.

(56) References Cited

U.S. PATENT DOCUMENTS

| | | |
|---|---|---|
| 5,948,839 A | 9/1999 | Chatterjee |
| 6,232,402 B1 | 5/2001 | Demeuse |
| 6,348,271 B1 | 2/2002 | Nakata et al. |
| 6,395,071 B1 | 5/2002 | Niijima et al. |
| 6,410,136 B1 | 6/2002 | DeMeuse |
| 6,485,817 B1 | 11/2002 | DeMeuse |
| 6,514,625 B1 * | 2/2003 | DeMeuse .......... 428/516 |
| 2005/0142372 A1* | 6/2005 | Su et al. ............ 428/516 |

* cited by examiner

*Primary Examiner*—James J. Seidleck
*Assistant Examiner*—Olga Asinovsky
(74) *Attorney, Agent, or Firm*—Morrison & Foerster LLP

(57) ABSTRACT

A biaxially oriented polyolefin multilayer film containing: (a) a core layer containing (i) greater than about 0% by weight to about 50% by weight of an isotactic polypropylene-containing impact copolymer, (ii) about 10% by weight to 70% by weight of an alpha olefin/polypropylene copolymer-containing thermoplastic olefin and (iii) about 10% by weight to 70% by weight of an isotactic propylene homopolymer; and (b) at least one polyolefin skin layer adjacent to the core layer is disclosed.

30 Claims, No Drawings

HIGH OXYGEN TRANSMISSION BIAXIALLY ORIENTED POLYPROPYLENE FILM

FIELD OF INVENTION

The invention relates to a polypropylene multilayer film comprising a polyolefin blended base layer and at least one outer layer. More preferably, the invention relates to a biaxially oriented polypropylene film that has high oxygen transmission.

BACKGROUND OF INVENTION

It is the objective of this invention to provide an economical solution to the high oxygen transmission biaxially oriented polypropylene (BOPP) film.

U.S. Pat. No. 6,232,402 (DeMeuse '402), discloses BOPP film comprising a mixture of 75–92% by weight isotactic polypropylene, 5–15% by weight low density polyethylene, and 3–10% by weight of an olefin heteropolymer containing polypropylene and at least one other 2–4 carbon alpha olefin. The invention cited examples claim oxygen transmission values in the range of between 206.0–285.6 cc/100 in$^2$/day. These oxygen transmission values are quite low as compared to the present invention. In addition, the presence of low density polyethylene and olefin heteropolymer in the formulation decreases the thermal properties of the BOPP film that are necessary during sealing.

U.S. Pat. No. 6,410,136 (DeMeuse '136), discloses a biaxially oriented film comprised of a mixture of 10%–60% by weight of isotactic polypropylene, 10%–25% by weight of low density polyethylene and about 15%–80% by weight of an olefin heteropolymer containing polypropylene and at least one other alpha olefin of 2 to 4 carbon atoms. The invention cited examples claim oxygen transmission values in the range of between 323.3–589.6 cc/100 in$^2$/day. These oxygen transmission values are in the range of the present invention, however the high levels of heteropolymer and low density polyethylene decreases the thermal properties of the film that are necessary during sealing.

U.S. Pat. No. 6,395,071 (Niijima), et al discloses a breathing film which contains a block copolymer composition comprising crystalline polypropylene and propylene alpha olefin random copolymer having 45–85% by weight of propylene unit based on the weight of copolymer. The film thickness is between 10 and 100 microns and having an antibacterial agent coated thereon or included therein. The invention cited examples claim oxygen transmission values in the range of between 781.3–800.8 cc/100 in$^2$/day. These oxygen transmission values are very good; however the tensile modulus values are in the range of from 122,000–126,000 psi, which is very low for the application.

U.S. Pat. No. 6,485,817 (Demeuse '817) discloses a transparent composite oriented film comprising a first layer and at least a second layer, said first layer consisting essentially of an ethylene/propylene copolymer including less than 10% by weight ethylene, said at least second skin layer being a high tensile modulus polypropylene. The invention examples indicate oxygen transmission values in the range of 215.2–363.7 cc/100 in$^2$/day. These oxygen transmission values are lower than the present invention.

U.S. Pat. No. 6,348,271 (Nakata) discloses a multilayer film having a thickness of 10–100 microns, wherein the film comprises at least one layer obtained by processing and drawing a block copolymer composition in at least monoaxial direction and the block copolymer composition comprises 93–30% by weight of a propylene polymer component and 7–70% by weight of an ethylene/propylene copolymer. This polymer is essentially a block copolymer where the ethylene/propylene copolymer content is tailored to balance the film transparency, tensile properties and oxygen transmission of the film. The example cited by this patent indicates oxygen transmission values in the range of 244–762 cc/100 in$^2$/day. However, as the oxygen transmission increases, the tensile properties are also reducing dramatically.

These prior art structures use either ethylene/propylene copolymers, polypropylene block copolymers including ethylene/propylene rubber, or three component blends with low density polyethylene. These methods of increasing oxygen transmission are only partially successful because each type sacrifices one or more desired film attributes in order to improve the oxygen transmission.

It is the object of this invention not only to increase the oxygen transmission of the film, but also to maximize gloss, tensile strength, and thermal resistance while minimizing haze. This BOPP film with balanced properties performance satisfies the total film requirements where the prior art structures do not fully satisfy all of these criteria.

SUMMARY OF THE INVENTION

This invention provides a film with high levels of oxygen transmission that are desired for the packaging of fruits, vegetables, and fresh cut salad. This invention further maintains necessary properties of the film such as haze, gloss, temperature resistance, and tensile strength. Achieving these objectives will result in a package with extended product shelf life, excellent surface aesthetics, and durability.

The inventive film provides a film that meets all of the performance criteria for this type of application. These performance requirements include an oxygen transmission of greater than 350 cc/100 in$^2$/day. In addition, these films have the same excellent temperature resistance performance as conventional BOPP films. Furthermore, the tensile modulus is greater than 150,000 psi. Finally, the optical properties meet the application requirements.

An embodiment of this invention is a biaxially oriented polyolefin multilayer film comprising (a) a core layer comprising (i) greater than about 0% by weight to about 50% by weight of an isotactic polypropylene-containing impact copolymer, (ii) about 10% by weight to 70% by weight of an alpha olefin/polypropylene copolymer-containing thermoplastic olefin and (iii) about 10% by weight to 70% by weight of an isotactic propylene homopolymer; and (b) at least one polyolefin skin layer adjacent to the core layer. Preferably, the isotactic polypropylene-containing impact copolymer has a melt flow index in the range of about 1 to 10 g/10 min. Preferably, the isotactic polypropylene-containing impact copolymer comprises a rubber having a rubber content of about 5–30% by weight of the copolymer. Preferably, the isotactic polypropylene-containing impact copolymer comprises a rubber having an ethylene content of about 10–80% by weight of the rubber. Preferably, the alpha olefin/polypropylene copolymer-containing thermoplastic olefin has a melt flow index in the range of about 1–10 g/10 min. Preferably, an alpha olefin/polypropylene copolymer of the alpha olefin/polypropylene copolymer-containing thermoplastic olefin comprises ethylene in an amount of about 1–10% by weight of the alpha olefin/polypropylene copolymer. Preferably, the alpha olefin/polypropylene-containing copolymer of the alpha olefin/polypropylene copolymer-containing thermoplastic olefin comprises a rubber having a rubber content of about 30–80% by weight of the copolymer. Preferably, the alpha olefin/polypropylene-containing impact copolymer comprises a rubber having an ethylene content of about 10–80% by weight of the rubber. Preferably, the isotactic propylene homopolymer has an isotactic index of about 90–98%. Preferably, the film has (i) an oxygen transmission of greater than 400 cc/100 in$^2$/day and (ii) a tensile modulus of greater than 150,000 psi.

Another embodiment is a biaxially oriented multilayer film comprising: (a) a core layer comprising a blend of (i) a first component comprising a continuous homopolymer matrix phase and a finely dispersed phase of first rubber particles, (ii) a second component comprising a continuous copolymer matrix phase and a finely dispersed phase of second rubber particles and (iii) and a third component comprising a homopolymer or a minirandom copolymer; and (b) at least one skin layer adjacent to the core layer. Preferably, the homopolymer matrix phase has a higher rigidity than the copolymer matrix phase. Preferably, the first rubber particles are substantially the same as the second rubber particles. Preferably, the homopolymer matrix phase comprises polypropylene. Preferably, the copolymer matrix phase comprises an ethylene-propylene copolymer. Preferably, the first and second rubber particles comprise ethylene-propylene rubber particles. Preferably, the third component is an isotactic propylene homopolymer. Preferably, the third component is a minirandom isotactic propylene-ethylene copolymer. Preferably, the film has (i) an oxygen transmission of greater than 350 cc/100 in$^2$/day and (ii) a tensile modulus of greater than 150,000 psi. More preferably, the film has (i) a thickness of about 0.4–1.0 mil, (ii) an oxygen transmission of greater than 400 cc/100 in$^2$/day and (iii) a tensile modulus of greater than 150,000 psi.

Another embodiment is a food packaging film comprising a core layer, wherein the film has (i) an oxygen transmission of greater than 350 cc/100 in$^2$/day and (ii) a tensile modulus of greater than 150,000 psi. Preferably, the core layer comprises a blend of (i) a first component comprising a continuous homopolymer matrix phase and a finely dispersed phase of first rubber particles, (ii) a second component comprising a continuous copolymer matrix phase and a finely dispersed phase of second rubber particles and (iii) and a third component comprising a homopolymer or a minirandom copolymer. In one variation, the food packaging further comprises at least one polyolefin skin layer adjacent to the core layer and wherein the film has a thickness of about 0.4–1.0 mil.

Another embodiment is a method of packaging a food product comprising obtaining a biaxially oriented polyolefin multilayer film and covering the food product with the biaxially oriented polyolefin multilayer film, wherein the biaxially oriented polyolefin multilayer film comprises (a) a core layer comprising (i) greater than about 0% by weight to about 50% by weight of an isotactic polypropylene-containing impact copolymer, (ii) about 10% by weight to 70% by weight of an alpha olefin/polypropylene copolymer-containing thermoplastic olefin and (iii) about 10% by weight to 70% by weight of an isotactic propylene homopolymer; and (b) at least one polyolefin skin layer adjacent to the core layer.

Additional advantages of this invention will become readily apparent to those skilled in this art from the following detailed description, wherein only the preferred embodiments of this invention is shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION OF THE INVENTION

Biaxially oriented polypropylene (BOPP) films are laminated to monolayer breathable blown films of various types of polyethylene, ethylene copolymers or ionomers. BOPP films are known to provide excellent transparency, thermal resistance, excellent gloss, and high tensile strength. The conventional BOPP film typically has not been modified and as such has high levels of crystalline content that reduce the transfer of gases such as oxygen and carbon dioxide through the film. BOPP film for food packaging could be supplied in a thickness range of 0.2–1.0 mil, preferably in a thickness range of 0.4–0.7 mil. The prior art film typically provides a barrier of 260 cc/100 in$^2$/day (0.4 mil) to 149 cc/100 in$^2$/day (0.7 mil). It is desirable to reduce the thickness of the BOPP film in order to provide adequate oxygen transmission. This reduction in thickness can be detrimental, as the film generally becomes more susceptible to edge tearing as the film is decreased in gauge. This edge tearing can be counterproductive for a film producer. In addition, the BOPP could be treated on one surface to accept printing inks readily. This BOPP film is reverse printed on the treated surface and subsequently adhesively laminated to the monolayer blown film. An anti-fog coating could be applied to the monolayer film after lamination. This laminated film could then be formed into a package to enclose product such as fruit, vegetables, or fresh cut salad that require breathability.

It is desired that the finished film product have the following characteristics: 1) High oxygen transmission, 2) Excellent surface gloss, 3) Excellent tensile strength, 4) Excellent thermal resistance and minimal heat shrinkage, and 5) Minimal Haze. The high oxygen transmission is desired such that the organic product can release carbon dioxide and intake oxygen. If neither one of these processes take place, the organic produce will spoil. Thus, in order to increase the product shelf life, it is necessary to increase the oxygen transmission of the film. The surface gloss is an important attribute of this film as it is a selling point to the consumer. Such surface gloss that is provided by conventional OPP films is attractive to the consumer and is differentiated on the market shelf. The tensile strength is desired during the printing and laminating processes as high tensions are used in these processes. Lack of appropriate tensile strength will cause the film to distort easily. The OPP film could have thermal resistance, as the converted laminated composite film will be heat sealed. It is necessary that the blown film behave as a sealant and melts thoroughly to itself to provide tensile strength. However, the BOPP film should not distort at these heat sealing temperatures nor heat shrink excessively (typically less than 15% dimensional change due to heat shrinkage in the MD direction, less than 10% dimensional change due to heat shrinkage in the TD direction when aged at 140° F. for 15 minutes). This distortion or excessive shrinkage will result in unpleasing package aesthetics for the consumer of the packaged organic product. Finally, the haze of the composite lamination should be low enough such that the consumer can view the packaged organic product. However, the blown film typically has a high level of haze, thus the BOPP film should have less haze than that of the blown film.

A thin gauge BOPP film of 0.40–1.0 mil thickness, preferably about 0.7 mil thick, is laminated to a blown polyethylene film. Since the BOPP film options available on the market have been limited, a film producer is forced to change the blown film type to match the end-user oxygen transmission requirements. As the oxygen transmission of the blown film becomes more demanding, more expensive and exotic resins are used to achieve the desired oxygen transmission, thus adding increased cost to the film producer. Therefore, there is a need for a biaxially oriented polypropylene film with high oxygen transmission. The claimed high oxygen transmission BOPP film would allow the film producer more freedom to increase the oxygen transmission of the composite lamination and thus provides lower cost options to the film producer.

The inventive film was designed with the main attribute of having high oxygen transmission. The necessity for this high oxygen transmission requirement is that when fruits and vegetables are harvested, they consume oxygen and give off carbon dioxide. Thus, it is also necessary for carbon dioxide to be transmitted through the package. Typically, carbon dioxide transmission through a film or lamination is four times greater than the oxygen transmission. Thus, if the oxygen transmission is increased the carbon dioxide transmission is also increased. In addition to the aforementioned increase in gas transmission through the film, it is desirable to balance other important film attributes. Among these desirable attributes are a high level of gloss, a low level of haze, good mechanical strength, and thermal stability.

The inventive film is constructed of multiple layers. One layer of the film is the core layer, which could form the bulk of the film structure. All of the film layers could contribute to the oxygen transmission of the film. Therefore, the composition and layer thickness distribution of the coextruded layers should preferably be considered carefully so as to maximize oxygen transmission as well as the other aforementioned properties.

The core layer of the inventive film is a multiple polymer component blend. The first component of the blend is a propylene homopolymer matrix impact copolymer. Preferably, the matrix resin of the impact copolymer is propylene homopolymer, while ethylene/propylene rubber is copolymerized into the homopolymer network. This type of product is typically manufactured in two reactors. In the first reactor, propylene homopolymer is produced and it is conveyed to a second reactor that also contains a high concentration of ethylene. The ethylene, in conjunction with the residual propylene left over from the first reactor, copolymerizes to form an ethylene-propylene rubber. The resultant product has two distinct phases: a continuous rigid propylene homopolymer matrix and a finely dispersed phase of ethylene-propylene rubber particles. The rubber content that is typically used is in the 10–30 wt. percent range depending on the desired end-use properties. In general, as the rubber concentration increases, the oxygen transmission will ultimately increase, however the haze of the film will increase and the tensile modulus of the film will decrease. Thus, there is an optimal rubber concentration to achieve the desired balance of film properties. If the ethylene concentration of the copolymer is too low the oxygen transmission will increase. As the ethylene concentrations become high, the film haze increases dramatically.

The second component of the blend is an ethylene/propylene copolymer matrix thermoplastic olefin (TPO). Preferably, the matrix resin of the TPO is an ethylene/propylene polymer, while ethylene propylene rubber is copolymerized into the ethylene/propylene copolymer network. This type of product is typically manufactured in three reactors. In the first reactor, ethylene/propylene copolymer is produced; it is conveyed to a second and third reactor where the ethylene/propylene copolymer is copolymerized with ethylene. The ethylene, in conjunction with the residual propylene left over from the second reactor, copolymerizes to form an ethylene-propylene rubber. The resultant product has two distinct phases: a continuous semi-rigid ethylene-propylene copolymer matrix and a finely dispersed phase of ethylene-propylene rubber particles. The rubber content that is typically used is in the 30–80 weight percent range depending on the desired end-use properties. In general, as the rubber concentration increases, the oxygen transmission will ultimately increase, however the haze of the film will increase and the tensile modulus of the film will decrease. Thus, there is an optimal rubber concentration to achieve the desired balance of film properties. If the ethylene concentration of the copolymer is too low the oxygen transmission will ultimately increase. As the ethylene concentrations become high, the film haze increases dramatically.

The third component of the blend is an isotactic propylene homopolymer or a "minirandom" copolymer, preferably a minirandom isotactic propylene-ethylene copolymer. A minirandom copolymer is defined as a polymer system of at least two polymers in which one polymer which is less than 1.0 weight percent of the minirandom copolymer is substantially randomly distributed throughout the minirandom copolymer. For example, a minirandom isotactic propylene-ethylene copolymer could be an isotactic propylene homopolymer copolymerized with 0.2–0.8% ethylene. The isotactic index of this polypropylene polymer can be between 90–98%, typically these minirandom copolymers are used to improve tenter film line processability, particularly through the transverse direction orientation process The polyolefin skin layers can be composed of any of the following and blends thereof: an isotactic propylene homopolymer, syndiotactic propylene homopolymer, metallocene catalyzed isotactic propylene homopolymer, metallocene catalyzed syndiotactic propylene homopolymer, ethylene-propylene random copolymer, butene-propylene random copolymer, ethylene-propylene-butene-1terpolymer, low density polyethylene, linear low density polyethylene, very low density polyethylene, metallocene catalyzed polyethylene, metallocene catalyzed polyethylene copolymers, ethylene-methacrylate copolymers, ethylene-vinyl acetate copolymers, and ionomer resins.

In the case where the polyolefin skin layers is a heat sealable layer, the heat seal layer can be composed of any of the following and blends thereof: an ethylene-propylene random copolymer, ethylene-butene-1copolymer, ethylene-propylene-butene-1terpolymer, propylene-butene copolymer, low density polyethylene, linear low density polyethylene, very low density polyethylene, metallocene catalyzed polyethylene plastomer, metallocene catalyzed polyethylene, metallocene catalyzed polyethylene copolymers, ethylene-methacrylate copolymer, ethylene-vinyl acetate copolymer and ionomer resin.

The polyolefin skin layers can be surface treated with either a standard corona treatment, flame treatment, atmospheric plasma, or a special corona treatment utilizing a mixed gas environment of nitrogen and carbon dioxide. Most particularly preferred is a surface treatment consisting of a special corona treatment utilizing a mixed gas environment of nitrogen and carbon dioxide. This core layer can then be directly printed, metallized, coated, adhesive laminated, or extrusion laminated. Most particularly preferred is printing of the skin layers.

COMPARATIVE EXAMPLE 1

A three layer 63 gauge biaxially oriented polypropylene (BOPP) film was manufactured on a 1.5-meter wide BOPP tenter line. The outer skin layers were 3 gauge units each. Both skin layers used an isotactic propylene homopolymer at a melt flow rate of 4.5 g/10 min as measured by ASTM D1238. Isotactic polypropylene resin was used in the core layer. The melt flow rate of the core isotactic propylene homopolymer was 1.6 g/10 min.

The sheet was heated to 135° C., stretched 5 times in the machine direction, cooled, introduced into a tenter oven, heated to 164° C., stretched to 9 times in the transverse direction and cooled.

COMPARATIVE EXAMPLE 2

A three layer 63 gauge biaxially oriented polypropylene (BOPP) film was manufactured on a 1.5-meter wide BOPP tenter line. The outer skin layers were 3 gauge units each. Both skin layers used an isotactic propylene homopolymer at a melt flow rate of 4.5 g/10 min as measured by ASTM D1238. The core layer was a two component blend of 33% by weight of the core layer of an isotactic polypropylene impact copolymer having a melt flow of 1.3 g/10 min and 67% of an isotactic propylene homopolymer having a melt flow index of 1.6 g/10 min. The isotactic polypropylene impact copolymer has a rubber content of approximately 10–20%, while the ethylene content of the rubber is approximately 50%.

The sheet was heated to 135° C., stretched 5 times in the machine direction, cooled, introduced into a tenter oven, heated to 164° C., stretched to 9 times in the transverse direction and cooled.

COMPARATIVE EXAMPLE 3

A three layer 63 gauge biaxially oriented polypropylene (BOPP) film was manufactured on a 1.5-meter wide BOPP tenter line. The outer skin layers were 3 gauge units each. Both skin layers used an isotactic propylene homopolymer at a melt flow rate of 4.5 g/10 min as measured by ASTM D1238. The core layer was a two component blend of 66% by weight of the core layer of an isotactic propylene impact copolymer having a melt flow of 1.3 g/10 min and 34% of an isotactic propylene homopolymer having a melt flow index of 1.6 g/10 min. The isotactic polypropylene impact copolymer has a rubber content of approximately 10–20%, while the ethylene content of the rubber is approximately 50%.

The sheet was heated to 135° C., stretched 5 times in the machine direction, cooled, introduced into a tenter oven, heated to 164° C., stretched to 9 times in the transverse direction and cooled.

COMPARATIVE EXAMPLE 4

A three layer 70 gauge biaxially oriented polypropylene (BOPP) film was manufactured on a 1.5-meter wide BOPP tenter line. The outer skin layers were 3 gauge units each. Both skin layers used an isotactic propylene homopolymer at a melt flow rate of 4.5 g/10 min as measured by ASTM D1238. The core layer was a two component blend of 33% of an ethylene/propylene-containing TPO having a melt flow of 6 g/10 min and 67% of an isotactic propylene homopolymer having a melt flow index of 1.6 g/10 min. The ethylene/propylene TPO has a rubber content of approximately 30–40%, while the ethylene content of the rubber is approximately 15–20%.

The sheet was heated to 135° C., stretched 5 times in the machine direction, cooled, introduced into a tenter oven, heated to 164° C., stretched to 9 times in the transverse direction and cooled.

EXAMPLE 1

A three layer 68 gauge biaxially oriented polypropylene (BOPP) film was manufactured on a 1.5-meter wide BOPP tenter line. The outer skin layers were 3 gauge units each. Both skin layers used an isotactic propylene homopolymer at a melt flow rate of 4.5 g/10 min as measured by ASTM D1238. The core layer was a two component blend of 66% by weight of the core layer of an isotactic polypropylene impact copolymer having a melt flow of 1.3 g/10 min and 34% by weight of the core layer of a ethylene/propylene TPO having a melt flow of 6 g/10 min. The isotactic polypropylene impact copolymer has a rubber content of approximately 10–20%, while the ethylene content of the rubber is approximately 50%. The ethylene/propylene TPO has a rubber content of approximately 30–40%, while the ethylene content of the rubber is approximately 15–20%.

The sheet was heated to 135° C., stretched 5 times in the machine direction, cooled, introduced into a tenter oven, heated to 164° C., stretched to 9 times in the transverse direction and cooled.

EXAMPLE 2

A three layer 70 gauge biaxially oriented polypropylene (BOPP) film was manufactured on a 1.5-meter wide BOPP tenter line. The outer skin layers were 3 gauge units each. Both skin layers used an isotactic propylene homopolymer at a melt flow rate of 4.5 g/10 min as measured by ASTM D1238. The core layer was a three component blend of 33% by weight of the core layer of an isotactic polypropylene impact copolymer having a melt flow of 1.3 g/10 min and 33% of a ethylene/propylene impact copolymer having a melt flow of 6 g/10 min and 34% of an isotactic propylene homopolymer having a melt flow index of 1.6 g/10 min. The isotactic polypropylene impact copolymer has a rubber content of approximately 10–20%, while the ethylene content of the rubber is approximately 50%. The ethylene/propylene TPO has a rubber content of approximately 30–40%, while the ethylene content of the rubber is approximately 15–20%.

The sheet was heated to 135° C., stretched 5 times in the machine direction, cooled, introduced into a tenter oven, heated to 164° C., stretched to 9 times in the transverse direction and cooled.

The film properties listed in the first column of Table 1 below of Comparative Examples and Examples were measured as follows and tabulated in Table 1.

(1) Film thickness: Film thickness was measured by physically measuring the thickness via commercially available and calibrated calipers or micrometers across the transverse width of the film in one-inch increments and averaging the total. Target average thickness was 0.00005 to 0.00006" or 0.5–0.6 mil or 50–60 gauge.

(2) Oxygen transmission (O2TR): Oxygen transmission rate of the film was measured by using a Mocon Oxtran 2/20 unit measured substantially in accordance with ASTM D3985. In general, the preferred value was equal to or greater than 350 cc/100 in$^2$/day.

(3) A and B Side gloss (45): Gloss was measured using a commercially available glossmeter such as available from Gardner Instruments "Mirror-Tri-Gloss" or Suga Test Instruments UGV-5D and measured substantially in accordance with ASTM D2457. Desired gloss values were 90 or higher.

(4) Haze: Haze was measured using commercially available haze meters such as Gardner Intruments "Haze-Gard Plus" and measured substantially in accordance with ASTM D1003. Desired haze values were 5% or less for a single sheet.

(5) Young's modulus: Modulus was measured using an Instron tensile tester, substantially in accordance with ASTM D882. Desired MD modulus values were 150,000 psi or more.

(6) Film melting temperature: Melting temperature of the film was measured using a differential scanning calorimetry (DSC) such as manufactured by Perkin-Elmer model DSC7 and was determined substantially in accordance with ASTM D3417–99.

(7) Heat Shrinkage (Dimensional Stability): Heat shrinkage or dimensional stability was measured substantially in accordance with ASTM D1204 at 140° F. for 15 minutes. Desired values were less than 15% shrinkage in the MD direction and less than 10% shrinkage in the TD direction.

TABLE 1

| Film Properties | Comparative Example 1 | Comparative Example 2 | Comparative Example 3 | Comparative Example 4 | Example 1 | Example 2 |
|---|---|---|---|---|---|---|
| Film Thickness (mil) | 0.63 | 0.63 | 0.65 | 0.65 | 0.68 | 0.7 |
| O2TR (cc/100 in$^2$/day) | 125.2 | 202.9 | 312.1 | 263.5 | 492.4 | 421.5 |
| A Side Gloss (45) | 114.4 | 92.4 | 73.1 | 124.3 | 91.1 | 105.5 |
| B Side Gloss (45) | 122.7 | 93.5 | 84.8 | 127.4 | 90.8 | 104.5 |
| Haze (%) | 0.77 | 4.83 | 26.1 | 3.59 | 5.81 | 5.58 |
| MD Tensile Modulus (psi) | 374,873 | 343,708 | 233,856 | 238,823 | 156,559 | 225,381 |
| Film Melting Temperature (C.) | 159.1 | 160.8 | 161.8 | 158.3 | 160 | 157.1 |

This application discloses several numerical ranges in the text and figures. The numerical ranges disclosed support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A biaxially oriented polyolefin multilayer film comprising:
   (a) a core layer comprising (i) greater than about 0% by weight to about 50% by weight of an isotactic polypropylene-containing impact copolymer comprising a rubber-containing phase in a range of 10–30 weight percent based on the weight of the isotactic polypropylene-containing impact copolymer, (ii) about 10% by weight to 70% by weight of an alpha olefin/polypropylene copolymer-containing thermoplastic olefin comprising a rubber-containing phase in a range of 10–30 weight percent based on the weight of the alpha olefin/polypropylene copolymer-containing thermoplastic olefin and (iii) about 10% by weight to 70% by weight of an isotactic propylene polymer; and
   (b) at least one polyolefin skin layer adjacent to the core layer.

2. The film of claim 1, wherein the isotactic polypropylene-containing impact copolymer has a melt flow index in the range of about 1 to 10 g/10 min.

3. The film of claim 1, wherein the isotactic polypropylene-containing impact copolymer comprises a rubber having a rubber content of about 5–30% by weight of the copolymer.

4. The film of claim 1, wherein the isotactic polypropylene-containing impact copolymer comprises a rubber having an ethylene content of about 10–80% by weight of the rubber.

5. The film of claim 1, wherein the alpha olefin/polypropylene copolymer-containing thermoplastic olefin has a melt flow index in the range of about 1–10 g/10 min.

6. The film of claim 1, wherein an alpha olefin/polypropylene copolymer of the alpha olefin/polypropylene copolymer-containing thermoplastic olefin comprises ethylene in an amount of about 1–10% by weight of the alpha olefin/polypropylene copolymer.

7. The film of claim 1, wherein the alpha olefin/polypropylene containing copolymer of the alpha olefin/polypropylene copolymer-containing thermoplastic olefin comprises a rubber having a rubber content of about 30–80% by weight of the copolymer.

8. The film of claim 1, wherein the alpha olefin/polypropylene containing impact copolymer comprises a rubber having an ethylene content of about 10–80% by weight of the rubber.

9. The film of claim 1, wherein the isotactic propylene polymer has an isotactic index of about 90–98%.

10. The film of claim 1, wherein the film has (i) an oxygen transmission of greater than 400 cc/100 in$^2$/day and (ii) a tensile modulus of greater than 150,000 psi.

11. A biaxially oriented multilayer film comprising:
   (a) a core layer comprising a blend of (i) a first component comprising a continuous polymer matrix phase and a dispersed phase comprising rubber particles in a range of 10–30 weight percent based on the weight of the first component, (ii) a second component comprising a continuous copolymer matrix phase and a dispersed phase comprising rubber particles in a range of 10–30 weight percent based on the weight of the second component and (iii) and a third component comprising a polymer or a minirandom copolymer; and (b) at least one skin layer adjacent to the core layer.

12. The film of claim 11, wherein the polymer matrix phase has a higher rigidity than the copolymer matrix phase.

13. The film of claim 11, wherein the first rubber particles are substantially the same as the second rubber particles.

14. The film of claim 11, wherein the polymer matrix phase comprises polypropylene.

15. The film of claim 14, wherein the copolymer matrix phase comprises an ethylene-propylene copolymer.

16. The film of claim 15, wherein the first and second rubber particles comprise ethylene-propylene rubber particles.

17. The film of claim 16, wherein the third component is an isotactic propylene polymer.

18. The film of claim 16, wherein the third component is a minirandom isotactic propylene-ethylene copolymer.

19. The film of claim 11, wherein the film has (i) an oxygen transmission of greater than 350 cc/100 in$^2$/day and (ii) a tensile modulus of greater than 150,000 psi.

20. The film of claim 18, wherein the film has (i) a thickness of about 0.4–1.0 mil, (ii) an oxygen transmission of greater than 400 cc/100 in$^2$/day and (iii) a tensile modulus of greater than 150,000 psi.

21. A method of packaging a food product comprising obtaining a biaxially oriented polyolefin multilayer film and covering the food product with the biaxially oriented polyolefin multilayer film, wherein the biaxially oriented polyolefin multilayer film comprises:

(a) a core layer comprising (i) greater than about 0% by weight to about 50% by weight of an isotactic polypropylene-containing impact copolymer comprising a rubber-containing phase in a range of 10–30 weight percent based on the weight of the isotactic polypropylene-containing impact copolymer, (ii) about 10% by weight to 70% by weight of an alpha olefin/polypropylene copolymer-containing thermoplastic olefin comprising a rubber-containing phase in a range of 10–30 weight percent based on the weight of the alpha olefin/polypropylene copolymer-containing thermoplastic olefin and (iii) about 10% by weight to 70% by weight of an isotactic propylene polymer; and (b) at least one polyolefin skin layer adjacent to the core layer.

22. The method of claim 21, wherein the isotactic polypropylene-containing impact copolymer has a melt flow index in the range of about 1 to 10 g/10 min.

23. The method of claim 21, wherein the isotactic polypropylene-containing impact copolymer comprises a rubber having a rubber content of about 5–30% by weight of the copolymer.

24. The method of claim 21, wherein the isotactic polypropylene-containing impact copolymer comprises a rubber having an ethylene content of about 10–80% by weight of the rubber.

25. The method of claim 21, wherein the alpha olefin/polypropylene copolymer-containing thermoplastic olefin has a melt flow index in the range of about 1–10 g/10 min.

26. The method of claim 21, wherein an alpha olefin/polypropylene copolymer of the alpha olefin/polypropylene copolymer-containing thermoplastic olefin comprises ethylene in an amount of about 1–10% by weight of the alpha olefin/polypropylene copolymer.

27. The method of claim 21, wherein the alpha olefin/polypropylene-containing copolymer of the alpha olefin/polypropylene copolymer-containing thermoplastic olefin comprises a rubber having a rubber content of about 30–80% by weight of the rubber.

28. The method of claim 21, wherein the alpha olefin/polypropylene-containing copolymer of the alpha olefin/polypropylene copolymer-containing thermoplastic olefin comprises a rubber having an ethylene content of about 10–80% by weight of the rubber.

29. The method of claim 21, wherein the isotactic propylene polymer has an isotactic index of about 90–98%.

30. The method of claim 21, wherein the film has (i) a thickness of about 0.4–1.0 mil, (ii) an oxygen transmission of greater than 350 cc/100 in$^2$/day and (iii) a tensile modulus of greater than 150,000 psi.

* * * * *